(12) United States Patent
Milder et al.

(10) Patent No.: US 8,126,595 B2
(45) Date of Patent: *Feb. 28, 2012

(54) SYSTEM AND METHOD FOR CONTROLLING HYDRONIC SYSTEMS HAVING MULTIPLE SOURCES AND MULTIPLE LOADS

(75) Inventors: Fredric Milder, Galisteo, NM (US); Boaz Soifer, Cerrillos, NM (US); Bristol Stickney, Tesuque, NM (US)

(73) Assignee: SolarLogic, LLC, Santa Fe, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/943,617

(22) Filed: Nov. 10, 2010

(65) Prior Publication Data

US 2011/0082593 A1 Apr. 7, 2011

Related U.S. Application Data

(63) Continuation of application No. 12/411,055, filed on Mar. 25, 2009, now Pat. No. 7,848,853.

(60) Provisional application No. 61/052,860, filed on May 13, 2008.

(51) Int. Cl.
*G01M 1/38* (2006.01)
*G05B 13/00* (2006.01)
*G05B 15/00* (2006.01)
*G05D 23/00* (2006.01)
*F03H 1/00* (2006.01)
*F24J 2/42* (2006.01)
*F24J 2/00* (2006.01)
*F24H 1/00* (2006.01)
*F24C 3/10* (2006.01)

(52) U.S. Cl. ........ 700/278; 700/276; 700/277; 60/203.1; 60/641.8; 126/561; 126/562; 126/569; 432/219

(58) Field of Classification Search .......... 700/276–278; 60/203.1, 641.8; 126/561–562, 569; 432/219

See application file for complete search history.

(56) References Cited

U.S. PATENT DOCUMENTS 3,996,998 A 12/1976 Garst et al.

(Continued)

*Primary Examiner* — Ramesh Patel

(74) *Attorney, Agent, or Firm* — Christopher & Weisberg, P.A.

(57) ABSTRACT

A system and method are provided to control hydronic systems having a plurality of sources, including at least one of an on-demand source, a semi-on-demand source, and an intermittent source that are fluidly or thermally coupled to a plurality of load zones. The hydronic system device obtains performance measurements for system components to provide system metrics, including failure diagnostics, energy capture, and usage optimization. The hydronic system device may also calculate British Thermal Units produced and used by the plurality of sources and loads to calculate incentives, including renewable energy credits.

20 Claims, 3 Drawing Sheets

U.S. PATENT DOCUMENTS

| | | | |
|---|---|---|---|
| 4,102,390 A | 7/1978 | Harnish et al. | |
| 4,178,988 A | 12/1979 | Cann et al. | |
| 4,190,199 A | 2/1980 | Cawley et al. | |
| 4,205,381 A | 5/1980 | Games et al. | |
| 4,215,408 A | 7/1980 | Games et al. | |
| 4,304,219 A | 12/1981 | Currie | |
| 4,339,930 A | 7/1982 | Kirts | |
| 4,407,447 A | 10/1983 | Sayegh | |
| 4,476,920 A | 10/1984 | Drucker et al. | |
| 4,505,426 A | 3/1985 | Rossi et al. | |
| 4,645,908 A | 2/1987 | Jones | |
| 4,685,615 A | 8/1987 | Hart | |
| 4,775,944 A | 10/1988 | Nakamura | |
| 4,897,798 A | 1/1990 | Cler | |
| 4,971,136 A | 11/1990 | Mathur et al. | |
| 5,259,445 A | 11/1993 | Pratt et al. | |
| 5,701,750 A * | 12/1997 | Ray | 62/160 |
| 5,775,581 A * | 7/1998 | Welden | 237/8 R |
| 5,814,902 A | 9/1998 | Creasy et al. | |
| 5,892,690 A | 4/1999 | Boatman et al. | |
| 6,122,603 A | 9/2000 | Budike, Jr. | |
| 6,263,260 B1 | 7/2001 | Bodmer et al. | |
| 6,311,105 B1 | 10/2001 | Budike, Jr. | |
| 6,385,510 B1 | 5/2002 | Hoog et al. | |
| 6,427,923 B1 | 8/2002 | Neve et al. | |
| 6,487,457 B1 | 11/2002 | Hull et al. | |
| 6,575,233 B1 | 6/2003 | Krumnow | |
| 6,729,390 B1 | 5/2004 | Toth et al. | |
| 6,757,591 B2 | 6/2004 | Kramer | |
| 6,874,693 B2 | 4/2005 | Readio et al. | |
| 6,909,921 B1 | 6/2005 | Bilger | |
| 6,912,429 B1 | 6/2005 | Bilger | |
| 6,957,696 B1 * | 10/2005 | Krumnow | 165/208 |
| 6,994,158 B2 | 2/2006 | Beitelmal et al. | |
| 7,274,973 B2 | 9/2007 | Nichols et al. | |
| 7,284,710 B2 | 10/2007 | Rixen et al. | |
| 7,311,986 B2 * | 12/2007 | Hsu | 429/425 |
| 7,343,226 B2 * | 3/2008 | Ehlers et al. | 700/276 |
| 7,389,159 B2 | 6/2008 | Warren et al. | |
| 7,398,778 B2 | 7/2008 | Kaiser | |
| 7,424,345 B2 | 9/2008 | Norbeck | |
| 7,444,189 B1 | 10/2008 | Marhoefer | |
| 2003/0066897 A1 * | 4/2003 | Carner et al. | 236/51 |
| 2003/0213246 A1 * | 11/2003 | Coll et al. | 60/653 |
| 2004/0058230 A1 * | 3/2004 | Hsu | 429/62 |
| 2005/0258261 A1 | 11/2005 | Gast | |
| 2007/0043478 A1 | 2/2007 | Ehlers et al. | |
| 2007/0114296 A1 | 5/2007 | Walborn | |
| 2007/0163773 A1 | 7/2007 | Webb et al. | |
| 2007/0239317 A1 | 10/2007 | Bogolea et al. | |
| 2008/0023564 A1 | 1/2008 | Hall | |
| 2008/0033600 A1 | 2/2008 | Norbeck | |
| 2008/0195254 A1 | 8/2008 | Jung et al. | |
| 2008/0195687 A1 | 8/2008 | Jung et al. | |
| 2008/0215186 A1 * | 9/2008 | Reid et al. | 700/277 |
| 2008/0271881 A1 * | 11/2008 | Blecker | 165/254 |
| 2008/0281472 A1 | 11/2008 | Podgorny et al. | |
| 2008/0294291 A1 * | 11/2008 | Salsbury | 700/277 |
| 2008/0306632 A1 | 12/2008 | Miki et al. | |
| 2009/0000611 A1 * | 1/2009 | Kaiser | 126/637 |
| 2009/0012650 A1 | 1/2009 | Wang et al. | |

* cited by examiner

SYSTEM AND METHOD FOR CONTROLLING HYDRONIC SYSTEMS HAVING MULTIPLE SOURCES AND MULTIPLE LOADS

CROSS-REFERENCE TO RELATED APPLICATIONS

This application is a Continuation Application of U.S. patent application Ser. No. 12/411,055, filed Mar. 25, 2009, entitled System and Method for Controlling Hydronic Systems Having Multiple Sources and Multiple Loads, now issued U.S. Pat. No. 7,848,853, issued Dec. 7, 2010, which claims priority to U.S. Provisional Patent Application No. 61/052,860, filed May 13, 2008, entitled Modular Design Method for Solar Hydronic Systems, the entire contents of which are incorporated herein by reference.

STATEMENT REGARDING FEDERALLY SPONSORED RESEARCH OR DEVELOPMENT n/a

FIELD OF THE INVENTION

The invention relates to controlling hydronic systems having a plurality of on-demand, semi-on-demand, and intermittent sources that may be fluidly or thermally coupled to a plurality of load zones. More particularly, the invention relates to controlling hydronic heating and cooling systems having a plurality of on-demand, semi-on-demand, and intermittent sources that are fluidly or thermally coupled to a plurality of load zones.

BACKGROUND OF THE INVENTION

Some homes and businesses employ zoned radiant heating systems or hydronic heating systems to heat living spaces, pools, spas, walkways and driveways. Hydronic heating systems distribute heated fluid through a series of heat exchanging pipes that are positioned throughout the heating zone. Conventional hydronic systems use on-demand sources, such as boilers and chillers, to thermally adjust fluids that circulate throughout the system.

Hydronic heating systems placed in living spaces may include radiant floor pipes and baseboard mounted or free-standing radiators that transfer heat from a plurality of boilers to the target heating zones. A controller is provided to receive heating request signals from heating zone thermostats. The controller communicates with aquastats, an injection system, fluid circulators and fluid valves to supply heated fluid from the boiler to the selected heating zones. While conventional hydronic heating systems may be coupled to solar heating systems to supplement the boiler heating capacity, existing controllers are not configured to optimize and/or store energy supplied from the solar heating systems. Various other drawbacks exist with these systems and other known systems in the prior art.

SUMMARY OF THE INVENTION

Various aspects of the invention overcome at least some of these and other drawbacks of existing systems.

According to one embodiment, a hydronic system is provided having a plurality of sources, including an on-demand source, a semi-on-demand sources, or an intermittent source. A plurality of source sensors is positioned to measure properties of the plurality of sources. A plurality of loads are provided that are fluidly or thermally coupled to the plurality of sources and that have a plurality of load sensors that are positioned to measure properties of the plurality of loads. A controller is provided that communicates with the plurality of sources, the plurality of source sensors, the plurality of loads and the plurality of load sensors. The controller includes a sensor interface that communicates with the plurality of source sensors and the plurality of load sensors to receive source sensor data and load sensor data. The controller includes a monitoring module that monitors the sensor data in substantially real-time, an alert module that generates an alert signal if the sensor data is different from predefined sensor threshold values, a ranking module that ranks the sources and the loads and a temperature setpoint module that contains preselected values for at least one of the plurality of loads. A trigger module is provided that generates a trigger signal if the preselected values from the temperature setpoint module are different from the measured properties received from the corresponding load. An actuator module is provided that communicates with the alert module, the ranking module and the trigger module and generates a control signal to fluidly or thermally couple selected ones of the plurality of sources to selected ones of the plurality of loads, or to fluidly or thermally decouple the plurality of sources and loads.

According to another embodiment, a method is provided for enabling a controller to communicate with a plurality of sources, a plurality of source sensors, a plurality of loads and a plurality of load sensors. The controller communicates with the plurality of source sensors and the plurality of load sensors to receive source sensor data and load sensor data. The controller monitors the sensor data in substantially real-time and generates an alert signal if the sensor data is different from predefined sensor threshold values. The controller ranks the sources and the loads, receives preselected values from at least one of the plurality of loads and generates a trigger signal if the preselected values received from at least one of the plurality of loads is different from the measured properties received from the corresponding load. A control signal is generated to fluidly or thermally couple selected ones of the plurality of sources to selected ones of the plurality of loads, or to fluidly or thermally decouple the plurality of sources and loads based on the alert signal, the trigger signal, the source and load ranking and a set of rules maintained by the controller.

The invention provides numerous advantages over and avoids many drawbacks of prior art systems. These and other features and advantages of the invention will be apparent through the detailed description of the embodiments and the drawings attached hereto. It is also to be understood that both the foregoing general description and the following detailed description are exemplary and not restrictive of the scope of the invention. Numerous other features and advantages of the invention should now become apparent upon a reading of the following detailed description when taken in conjunction with the accompanying drawings, a brief description of which is included below.

BRIEF DESCRIPTION OF THE DRAWINGS

The accompanying drawings, which are incorporated into and form a part of the specification, illustrate one or more embodiments of the invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
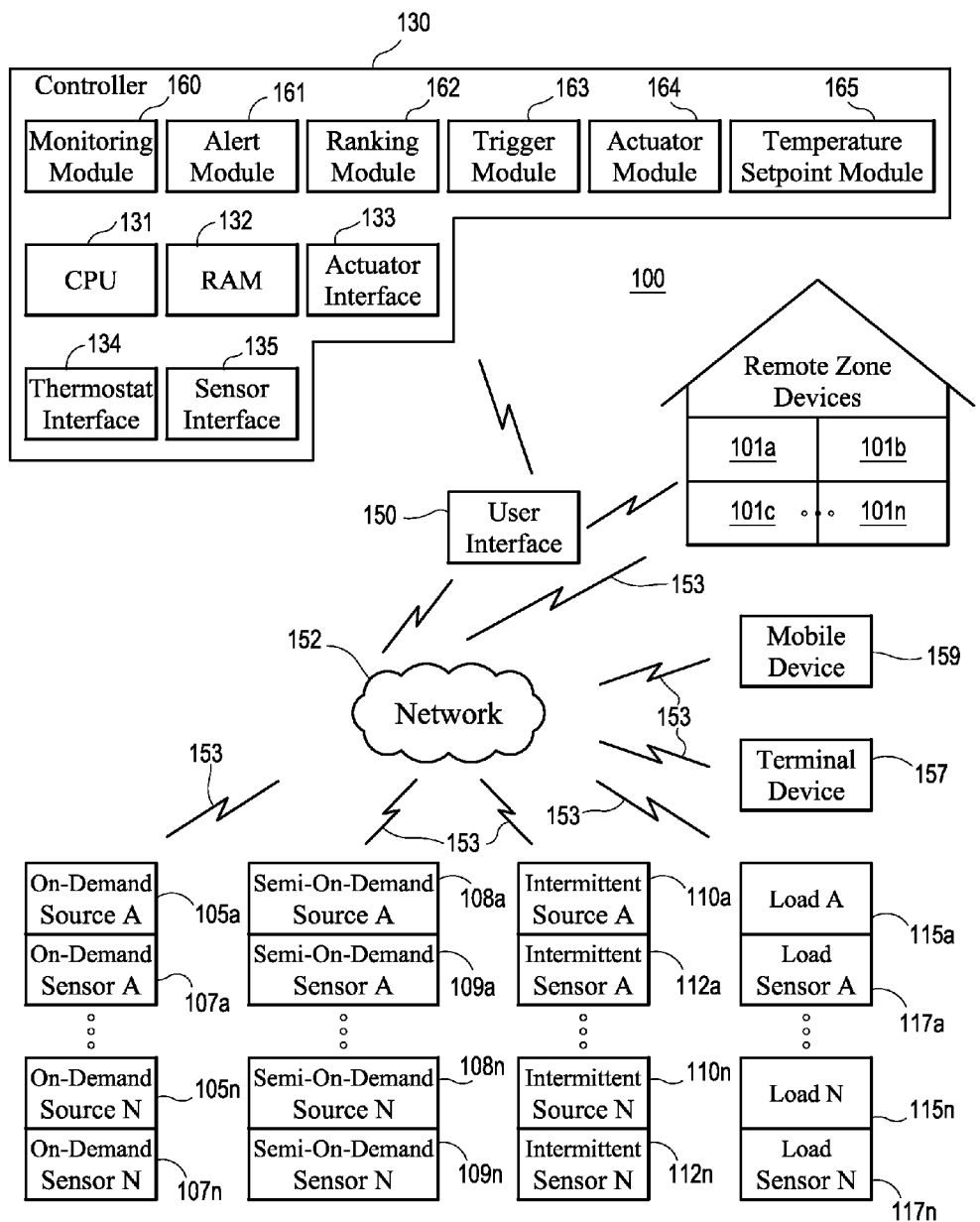
FIG. 1 illustrates an exemplary system diagram according to one embodiment of the invention.

The invention provides multiple sources and multiple load hydronic systems having controllers that may be coupled to the plurality of sources and loads. The multiple sources may include boilers, solar heat collectors, wood fired hydronic boilers, heat pumps, and heat storage devices, among other sources. The multiple loads may include domestic hot water, baseboard or radiator zones, radiant heated floors (mass or non-mass floors), pool or tub with external heat exchanger, pool or tub with direct radiant heating, ice melt zones, and heat storage device. Heat storage devices include any structures that store heat, such as a water tank, in-mass floors, or other heat storage devices. In-mass floors have radiant tubing within a heat storage material, such as concrete.

The multiple sources include on-demand, semi-on-demand, and intermittent sources. On-demand sources include any devices that may be activated and deactivated upon a user's demand. For example, on-demand sources include geothermal devices, common boilers and furnaces, and heat pumps, among other on-demand sources. According to one embodiment, on-demand sources may operate using energy sources, such as electricity, natural gas, propane, gasoline, and fuel oil, among other energy sources.

Semi-on-demand sources include any devices that may be activated and deactivated on demand, but that have features that differentiate them from on-demand sources. The features may include non-instantaneous production of desired results, such as delayed heating or cooling, among other features. For example, upon activation, semi-on-demand sources may take an extended period of time to attain a desired temperature. Alternatively, upon deactivation, semi-on-demand sources may retain residual energy that may be directed to other sources or loads. Semi-on-demand sources may include wood- or biomass-burning boilers and furnaces, among other semi-on-demand sources.

By contrast, intermittent sources include sources that are activated and deactivated upon the occurrence of events that are uncontrolled by the system. For example, intermittent sources may include solar thermal sources (such as solar panels), wind generators, manually operated furnaces such as wood-burning furnaces fired by homeowners, and co-generation devices, among other intermittent sources. Solar thermal sources produce heat energy when solar rays impinge solar collectors during daylight hours. By contrast, solar thermal sources produce reduced or no heat energy during overcast conditions or during non-daylight hours.

Co-generation devices may include back-up power generators. Co-generation devices may be on-demand sources or intermittent sources and may be used in conjunction with other sources of the hydronic system. For example, back-up power generators may include engines, which are configured to produce electricity, but generate significant waste heat. The back-up power generators may be fluid cooled to capture the waste heat, which may be applied to the hydronic system. Back-up power generators configured as on-demand sources would be activated to produce heat and electricity when other sources are not producing sufficient heat energy.

Alternatively, according to one embodiment, back-up power generators may be configured exclusively as intermittent sources. Back-up generators configured in this manner are activated to supply back-up electricity. Under these conditions, the heating system is not in control of when the waste heat is produced by the generator. A system is needed that will provide efficient and reliable use of the on-demand, semi-on-demand, and the intermittent sources.

The invention further provides a controller for hydronic systems that obtains performance measurements of system components. Performance measurements include fluid flows, intake temperature readings, output temperature readings, preheat temperature readings, temperature rise at start-up, component current consumption, voltage drops, and component revolutions per minute, among other performance measurements. System components include pumps, valves, boilers, furnaces, thermostats and aquastats, among other system components. According to one embodiment, the performance measurements may be analyzed to provide metrics, including failure diagnostics, energy capture, and usage optimization, among other metrics. The controller may be programmed to execute a set of rules that are manually entered by a user or that are automatically created based on the performance measurements. Fluid flow measurements and temperature gradient measurements may be employed to determine an amount of energy supplied by a component, the amount of energy used by a load, and source device efficiency. These measurements may provide a determination of fuel consumption reduction due to the introduction of solar heat or other renewable heat sources. These measurements may also allow a determination of heat lost to non-productive uses. Non-productive uses include heat energy lost by a heat storage device and heat dissipated to a surrounding environment by a domestic hot water tank, among other non-productive uses.

The invention further provides a controller that measures British Thermal Units (BTUs) produced and used by the plurality of sources and loads. According to one embodiment, the invention may generate a BTU summary for the hydronics system based on individual devices. Alternatively, the invention may generate a BTU summary for the hydronics system based on groups of devices. The BTU measurements may be used to calculate incentives, including renewable energy credits, carbon emissions tax reduction, carbon cap and trade credits, and renewable energy credit certificates sellable to power companies, among other incentives.

While specific embodiments of the invention are discussed herein and are illustrated in the drawings appended hereto, the invention encompasses a broader spectrum than the specific subject matter described and illustrated. As would be appreciated by those skilled in the art, the embodiments described herein provide but a few examples of the broad scope of the invention. There is no intention to limit the scope of the invention only to the embodiments described.

FIG. 1 illustrates system architecture 100 according to one embodiment of the invention. Remote zone devices 101*a*-101*n* (hereinafter identified collectively as 101) may include temperature sensors, infrared sensors, thermostats, and meters, among other remote zone devices. According to one embodiment, one or more remote zone devices 101 may be assigned to a single user and may be programmed with user preferences. For example, one or more remote zone devices 101 may be assigned directly or indirectly to a user. Regarding indirect assignment, the remote zone devices 101 may be assigned to a room and the user may be assigned to the same room, thereby creating an association between the remote zone devices 101 and the user. When the user enters the assigned room, the system may configure the environment to the user preferences.

According to one embodiment, a plurality of sources may be provided to include on-demand sources 105a-105n (hereinafter identified collectively as 105), semi-on-demand sources 108a-108n (hereinafter identified collectively as 108) and intermittent sources 110a-110n (hereinafter identified collectively as 110). On-demand sources 105 may include any energy sources that may be activated upon a user's demand. For example, on-demand sources 105 include geothermal devices, boilers, furnaces, and heat pumps, among other on-demand sources. According to one embodiment, on-demand sources 105 may operate using energy sources such as electricity, natural gas, propane, gasoline, among other energy sources. On-demand sources 105 may include on-demand sensors 107a-107n (hereinafter identified collectively as 107) that measure properties or performance characteristics of system components for the on-demand sources 105.

Semi-on-demand sources 108 include any devices that may be activated and deactivated on demand, but that have features that differentiate them from on-demand sources. The features may include non-instantaneous production of desired results, such as delayed heating or cooling, among other features. For example, upon activation, semi-on-demand sources 108 may take an extended period of time to attain a desired temperature. Alternatively, upon deactivation, semi-on-demand sources 108 may have residual energy that may be directed to other sources or loads. Semi-on-demand sources 108 may include wood- or biomass-burning boilers and furnaces, among other semi-on-demand sources. Semi-on-demand sources 108 may include semi-on-demand sensors 109a-109n (hereinafter identified collectively as 109) that measure properties or performance characteristics of system components for the semi-on-demand sources 108.

By contrast, intermittent sources 110 include sources that are activated and deactivated upon the occurrence of events that are uncontrolled by the system 100. For example, intermittent sources 110 may include solar thermal sources (such as solar thermal panels), wind generators, manually operated furnaces, and co-generation devices, among other intermittent sources. Intermittent sources 110 may include intermittent sensors 112a-112n (hereinafter identified collectively as 112) that measure properties or performance characteristics of system components for the intermittent sources 110.

According to one embodiment, properties include component current consumption and voltage drops, among other properties. Performance characteristics include fluid flows, intake temperature readings, output temperature readings, preheat temperature readings, temperature rise at start-up, component revolutions per minute, and BTU meters readings, among other performance characteristics. System components include pumps, valves, boilers, furnaces, thermostats and aquastats, among other system components.

According to one embodiment, the properties and performance measurements may be analyzed to generate metrics, including failure diagnostics, energy capture, and usage optimization, among other metrics. The system 100 may be configured to allow remote diagnostics and remote troubleshooting of devices based on analysis of selected properties and monitored data, among other data. The system may log information automatically or on command, including system design, commissioning history, service history, and communication history, among other information.

According to one embodiment, the system 100 may include one or more controller devices 130. The controller devices 130 may include a processor 131, RAM 132, a USB interface, an actuator interface 134, a thermostat interface 135, a sensor interface 136, a wide area network (WAN) interface, a local area network (LAN) interface, an Internet interface, a hard disk, a wireless communication interface, a touch-screen display, a ranking interface, and a computer display, among other components. The thermostat interface 135 receives preselected values from thermostats positioned in at least one of the plurality of load zones and may send information to thermostats. The sensor interface 136 receives real-time values from sensors in the system such as the plurality of load zones, the plurality of sources, and system components such as aquastats positioned on domestic hot water tanks. The actuator interface 134 sends actuating signals to system components such as motorized valves and pumps to couple or decouple zones and sources as desired. The actuator interface may also receive real-time performance measurements from system components under its control.

The controller devices 130 may communicate with devices, including the on-demand sources 105, the on-demand sensors 107, the semi-on-demand sources 108, the semi-on-demand sensors 109, the intermittent sources 110, the intermittent sensors 112, the loads 115, the load sensors 117, the remote zone devices 101, user interfaces 150, the network 152, terminal devices 157, mobile devices 159, and/or other devices. According to one embodiment, the controller devices 130 may identify a device using an identification handshake.

According to one embodiment, the controller devices 130 may include, or be modified to include, software modules that may operate to provide control functions. The software may be updated over the network 152, such as the Internet. The controller devices 130 may include one or more software agents that coordinate data capture, data storage and execution of rule sets. The captured data may be stored locally at the controller devices 130, remotely on a peripheral device, or sent to another computer or device via a LAN or the Internet.

The controller devices 130 may be of modular construction to facilitate adding, deleting, updating and/or amending modules therein and/or features within modules. Modules may include a monitoring module 160, an alert module 161, a ranking module 162, a trigger module 163, an actuator module 164, and a temperature setpoint module 165, among other modules. The monitoring module 160 monitors sensor data in substantially real-time, including on-demand sensor data, semi-on-demand sensor data, intermittent sensor data, source sensor data and load sensor data, among other sensor data. The alert module 161 may generate alert signals if the sensor data is different from predefined sensor threshold values. For example, the alert module 161 may generate alert signals if the source sensor data is different from predefined source sensor threshold values.

The ranking module 162 applies ranking criteria to rank the plurality of sources 105,108,110 and the plurality of loads 115. According to one embodiment, the ranking module 162 may rank the sources 105,108,110 according to source criteria, such as availability, unit cost of producing energy, temperature of source fluid, energy flux available from a source, and unit carbon emissions associated with a source, among other source criteria. The unit cost of producing energy, for example, may vary depending on the type of natural resource and the time of day.

The ranking module 162 may employ rules to rank the loads 115 according to load criteria, such as temperature needed for heating, energy flux needed for heating, priority of the heat load, and the total energy needed to attain a desired temperature, among other load criteria. The heat load priority may be associated with user comfort and may include absolute priorities and relative priorities. The ranking module 162 may apply absolute priority rules to select heat loads that receive heat energy before other heat loads. For example, the ranking module 162 may specify an absolute priority that the sources 105,108,110 maintain predefined water temperatures in hot water heaters before directing the sources 105,108,110 to maintain predefined temperatures in an interior space, such as a room. The ranking module 162 may apply relative priorities to select heat distribution among loads based on user impact. For example, users may notice a larger decrease in comfort if a room temperature varies from a predefined setpoint value compared to if a swimming pool temperature varies from a predefined setpoint value. Therefore, if the temperature of two loads varies from corresponding setpoint values, then the ranking module 162 may apply relative priority rules to direct the sources 105,108,110 to apply energy to maintain an interior space temperature at the setpoint value before applying energy to maintain the swimming pool temperature at the setpoint value. Regarding the total energy needed to bring a heat load to a desired temperature, the ranking module 162 may rank loads based on whether the load medium is a gas or liquid. In other words, the ranking module 162 may calculate energy requirements depending on whether a source 105,108,110 is requested to adjust the temperature of a gas, such as room air, or a liquid such as a swimming pool. The ranking module is configured to perform dynamic calculations based on criteria obtained from various devices, including the on-demand sources 105, the semi-on-demand sources 108, the intermittent sources 110 and the loads, among other devices.

The trigger module 163 may generate a trigger signal if the preselected values that are received from at least one of the plurality of load zones are different from the measured properties received from the corresponding load zone. The actuator module 164 communicates with the alert module 161, the ranking module 162 and the trigger module 163 and generates a control signal to fluidly or thermally couple selected ones of the plurality of sources to selected ones of the plurality of loads 115, or to fluidly decouple the plurality of sources or loads. The actuator module 164 may fluidly or thermally couple selected ones of the plurality of sources to the heat storage device when the alert module 161 generates the alert signal and the trigger module 163 fails to generate the trigger signal. According to one embodiment, during normal operation, the actuator module 164 decouples the plurality of sources when the alert module 161 fails to generate the alert signal and the trigger module 163 fails to generate the trigger signal. The temperature setpoint module 165 may include stored preset values for the load zones. The preset values may be adjusted by communicating with components, including the thermostat interface 135, the user interface 150, the remote devices 101, the mobile devices 159, and the terminal devices 157, among other components. The preset values may represent various conditions under which the system 100 is intended to operate. For example, the temperature setpoint module 165 may include normal mode preset values and different vacation mode preset values.

In vacation mode, the system 100 may operate so that the on-demand sources 105 are deactivated, unless extreme or undesirable conditions occur. For example, the on-demand sources 105 may remain deactivated unless adverse conditions arise, such as temperature conditions falling to levels that risk freezing water pipes, among other adverse conditions. According to one embodiment, the temperature setpoint module 165 and the thermostat interface 135 may communicate to override preset values when operating in the vacation mode. In other words, regardless of whether the thermostat generates a heat request, selected trigger signals may be set or reset during the vacation mode according to preset vacation mode values.

According to one embodiment, the temperature setpoint module 165 may include temperature settings for the semi-on-demand sources 108 and the intermittent sources 110. The temperature setpoint module 165 may communicate with the trigger module 163 to control the semi-on-demand sources 108 and the intermittent sources 110. If the target heat load 115 terminates a heat request, then the semi-on-demand source 110 may be deactivated. The temperature setpoint module 165 may detect residual heat remaining in the semi-on-demand source 110 and may communicate with the trigger module 163 to generate a trigger signal coupling the semi-on-demand source 110 to another load 115, even though the other load is not requesting heat. For example, the residual heat may be diverted to in-mass floors. Applying residual heat to in-mass floors does not noticeably alter room temperature because the floor mass is relatively large. The residual heat is gradually dissipated into the room as the room air cools, such as in the evening. In other words, selected loads may be used to store residual heat, thereby minimizing waste. The system 100 may include a plurality of loads for storing residual heat.

It should be readily understood that a greater or lesser number of modules might be used. One skilled in the art will readily appreciate that the invention may be implemented using individual modules, a single module that incorporates the features of two or more separately described modules, individual software programs, and/or a single software program.

According to one embodiment, communications may occur between the various devices of the system 100 via network 152. According to another embodiment, network 152 may include the Internet. Alternatively, the devices may communicate via non-network communications media 153, such as, for example, any wired or wireless media. Communications may occur substantially in real-time, on command, or at predetermined intervals. One of ordinary skill in the art will appreciate that communications may be conducted in various ways and among various devices.

Terminal device 157, mobile device 159, and user interface 150 may include any number of different types of devices, such as personal computers, laptops, smart terminals, personal digital assistants (PDAs), cell phones, Web TV systems, video game consoles, touch screen terminals, keypads, kiosks, or devices that combine the functionality of one or more of the foregoing or other client terminal devices. Furthermore, terminal device 157, mobile device 159 and user interface 150 may be manipulated by positioning an indicator over selected icons using a touch-sensitive display screen or a mouse, a keyboard, a voice recognition system or other input receiving devices. User interface 150 may provide a central access point to controller devices 130 in order to control an entire user space, such as a home. User interface 150 may include a touch-sensitive display screen and may be combined with an audio input device.

According to one embodiment, terminal device 157 and mobile device 159 may provide users and system installers with remote access to the system 100. The remote access may include reviewing interacting parameters to confirm optimized operating zones, viewing logged data, or placing the system in predetermined operating conditions for diagnostic purposes. If needed, the system may automatically adjust or allow manual adjustment of interacting parameters.

The invention may automatically authenticate users that are associated with the terminal devices 157 or mobile devices 159. Alternatively, the system 100 may require users that desire to access the controller devices 130 through an unknown device to be authenticated before being granted remote access. If users are not authenticated, then the users may be invited to submit requested information or take other action. If the user is authenticated, then system 100 may perform other processing. For example, controller devices 130 may load data or perform other functions (e.g., produce hot water).

With regard to user authentication, one of several different authentication schemes may be employed, and would be appreciated by those skilled in the art. For example, the user may be asked to input an alphanumeric code. Alternatively, the user may be asked to provide biometric information (i.e., a thumbprint through a fingerprint scanner) or other suitable identifying information.

Loads 115a-115n (hereinafter identified collectively as 115) may represent destinations for the heating fluid, including living spaces, pools, spas, walk ways, gardens, ice melt areas and driveways, among other destination. Users may prioritize the loads 115 and may assign the loads to selected sources. For example, if the load 115, such as a pool or an ice melt area, is designated a non-essential load, then the system may assign intermittent sources 110 to these load 115. An ice melt area may be assigned to intermittent sources 110, such as solar heat sources, or low-cost, low-temperature on-demand heat source, such as geothermal sources. The ice melt area may be prevented from using (or being assigned) more expensive on-demand sources 105, such as propane or electric sources, among other more expensive on-demand sources 105.

Additionally, if intermittent sources 110, such as solar heat, are not available due to overcast conditions, then the system may make real-time decisions to divert the geothermal source from a lower priority load, such as the ice melt area, to a higher priority load, such as space heating. Ranking priorities may be changed permanently or dynamically for the various loads 115 as conditions change. According to one embodiment, the ranking priorities may be changed using the user interface 150, the mobile devices 159, the terminal devices 157, devices over the network, or other devices.

Additionally, any loads 115 that are associated with living spaces or domestic hot water, for example, may be assigned a highest priority. As a result, the intermittent sources 110 and semi-on-demand sources 108 initially may be programmed to satisfy high priority loads, such as living spaces or domestic hot water. If any heat remains at the intermittent sources 110 and the semi-on-demand sources 108, then the heat associated with these sources may be diverted to the lower priority loads, such as a pool. According to one embodiment, the controller devices 130 may be programmed so that on-demand sources 105 are not used to heat low priority loads.

According to one embodiment, the controller devices 130 may analyze the data associated with load sensors 117a-117n (hereinafter identified collectively as 117), the on-demand sensors 107, the semi-on-demand sensors 109 and the intermittent sensors 112. The controller devices 130 may compare the actual data, the theoretical data and the user preferences of how the loads 115 are heated relative to how the respective on-demand sources 105, semi-on-demand sources 108 and intermittent sources 110 performed.

Based on results of the comparison, the controller devices 130 may modify device settings to align predicted actual data with the theoretical data and the user preferences. The controller devices 130 may be programmed to enable system expansion, including increasing the number and type of sources and loads, without changing the basic system software or hardware. For example, the controller devices 130 may be programmed to modify device parameters.

Figure 2:
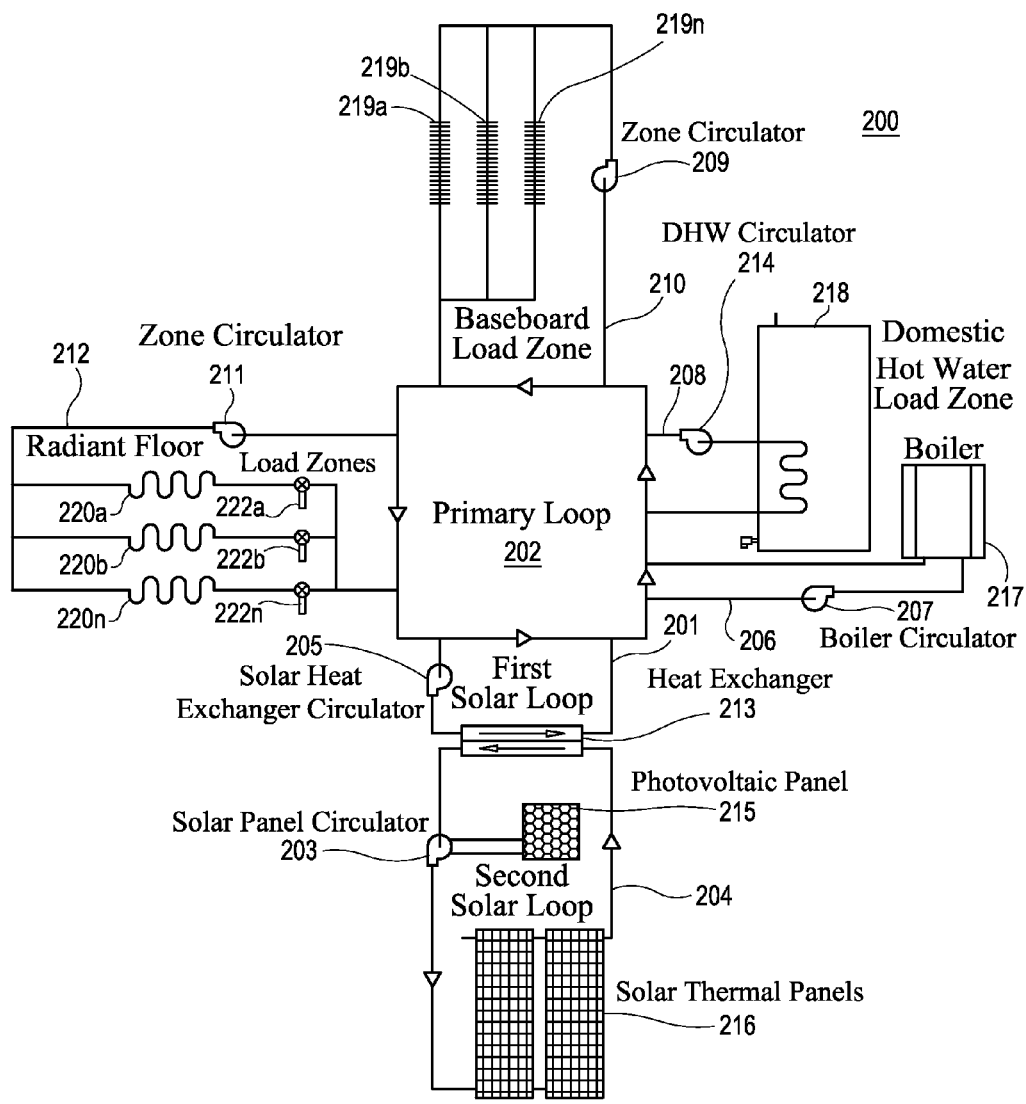
FIG. 2 illustrates a primary/secondary loop design for a hydronic system according to one embodiment of the invention.

FIG. 2 illustrates an exemplary embodiment of a system layout 200 having a primary loop 202 and secondary loops having multiple connections. The secondary loops include sources, such as solar loop 204 and boiler loop 206. The secondary loops also include loads, such as baseboard loop 210 and radiant floor loop 212. Furthermore, the secondary loops may include combined sources and loads, such as domestic hot water loop 208, which acts as both a source that supplies heated fluid and a load that receives heated fluid.

According to one embodiment, the secondary loops 204, 206, 208, 210 and 212 may be connected to the primary loop 202 using a plurality of pipes. For example, the connections may be accomplished using two pipes. The primary loop 202 may employ a primary pump or may be designed with check valves that allow primary circulation to be driven by secondary pumps.

FIG. 2 illustrates the primary loop 202 and the secondary loops 204, 206, 208, 210 and 212 configured as spokes around a wheel, with a central hub (primary) surrounded by the secondary loop modules. The solar loop 204 may include a first solar loop 201 having a solar heat exchange circulator 205. A second solar loop 204 may be coupled to the first solar loop through a heat exchanger 213. The second solar loop 204 includes a solar panel circulator 203, a photovoltaic panel 215 and solar thermal panels 216. The boiler loop 206 includes a boiler circulator 207 and boiler 217. The domestic hot water loop 208 includes a domestic hot water (DHW) circulator 214 and a domestic hot water tank 218. The baseboard loop 210 includes a zone circulator 209 and baseboards 219a-219n. The radiant floor loop 212 includes zone circulator 211, tubing 220a-220n and controllable isolation valves 222a-222n.

When using a primary loop design, the hot supply fluid typically mixes with the cooler return fluid as it flows around the loop, resulting in a progressive temperature drop. While FIG. 2 illustrates a counterclockwise direction, one skilled in the art will readily appreciate that a clockwise direction may be used. The secondary loops 204, 206, 208, 210 and 212 may be arranged to take advantage of this temperature decline, by arranging piping clusters in order of thermal requirements. In other words, the domestic water tank 218 is positioned closest to the heat source boiler 217 to receive the hottest fluid. The remaining heating loads are arranged around the primary loop in order of declining temperature necessity. FIG. 2 demonstrates this temperature staging by showing the boiler 206 feeding the domestic hot water (DHW) tank 218 first, then the hydronic baseboards 219a-219n, then the radiant floors 220a-220n.

According to one embodiment, the source loops and the load loops may be decoupled using controllable isolation valves 222a-222n, as shown in the radiant floor zones 212. Alternatively, the source loops and the load loops may be uncoupled using a pump in place of an isolation valve. For example, pumps may include the boiler circulator 207, the DHW circulator 214, the zone circulators 209,211 and the solar heat exchange circulator 205. When using pumps to uncouple loops, the flow resistance of inactive pumps effectively stops fluid flow and heat transfer.

FIG. 2 illustrates a heat exchanger 213 that transmits heat between the second solar loop 204 and the first solar loop 201. The heat exchanger 213 allows the fluid in the first solar loop 201 to be different than the fluid in the second solar loop 204. For example, the fluid circulating in the second solar loop 204 may contain a mix of water and anti-freeze, whereas the fluid circulating in the first solar loop 201 and the primary loop 202 may be water. Other fluids may be used. In this case, the second solar loop 204 remains fluidly isolated from the other fluid loops, but is thermally coupled or decoupled from the primary loop 202 by turning the solar heat exchanger circulator 205 and the solar panel circulator 203 on or off in tandem, as desired.

According to one embodiment, if solar heat is adequate to supply the heat energy requirements of the loads requesting heat, then the boiler loop 206 is decoupled or uncoupled from the primary loop 202. The boiler loop 206 may be uncoupled from the primary loop 202 by turning off the boiler circulator 207. Additionally, heat flowing in the second solar loop 204 may be used to preheat fluid in the primary loop 202 before the fluid is directed into the boiler loop 206. The invention takes temperature order into consideration and provides a preferred order for piping connections, including providing priority control options as needed. The secondary loops typically employ a pump and other plumbing components, including check valves, isolation (ball) valves, mixing valves, temperature gauges, pump unions, and other components as needed by the heating load.

The invention is compatible with other heating functions and controls, including but not limited to room thermostats using one or two stage heating or cooling, programmable room thermostats, wireless room thermostats, building energy control systems, remote monitoring or data logging systems, and/or remote program adjustment. One or more optional hydronic cooling sub-systems such as radiant night sky cooling radiators, multi-stage evaporative cooled hydronic fluid, reverse heat-pump cooled liquid, and/or liquid to air duct cooling heat exchangers and the appropriate controls may also be employed. In particular, the invention provides hydronic systems that may be used both as heating systems and cooling systems.

When used for cooling, the role of the heat loads and sources is typically reversed. Heat is taken from selected load zones and transferred via the system to either another load zone, or to a heat source, or a cooling sub-system. Other heating sources and their related components and controls may optionally be employed, such as a wood-fired hydronic boiler (with or without water heat storage tank), a ground source heat pump, a waste heat recovery (co-generation), drain down solar collector systems, and/or other solar heat collector types. In addition, other heating load systems, components and controls may be used, including but not limited to a heat storage device with external heat exchanger and/or heat storage devices with one or more internal heat exchangers. A common heat storage device includes one or more water tanks with internal or external heat exchangers. These techniques and devices are known to those skilled in the art. The invention also may be used to control and optimize waste heat recovery, where the waste heat is produced as a consequence of cooling another zone. For example, when cooling a zone such as a computer room, the cooling equipment of that room produces waste heat and can be treated as a relatively low-temperature intermittent heat source by the heating system.

Figure 3:
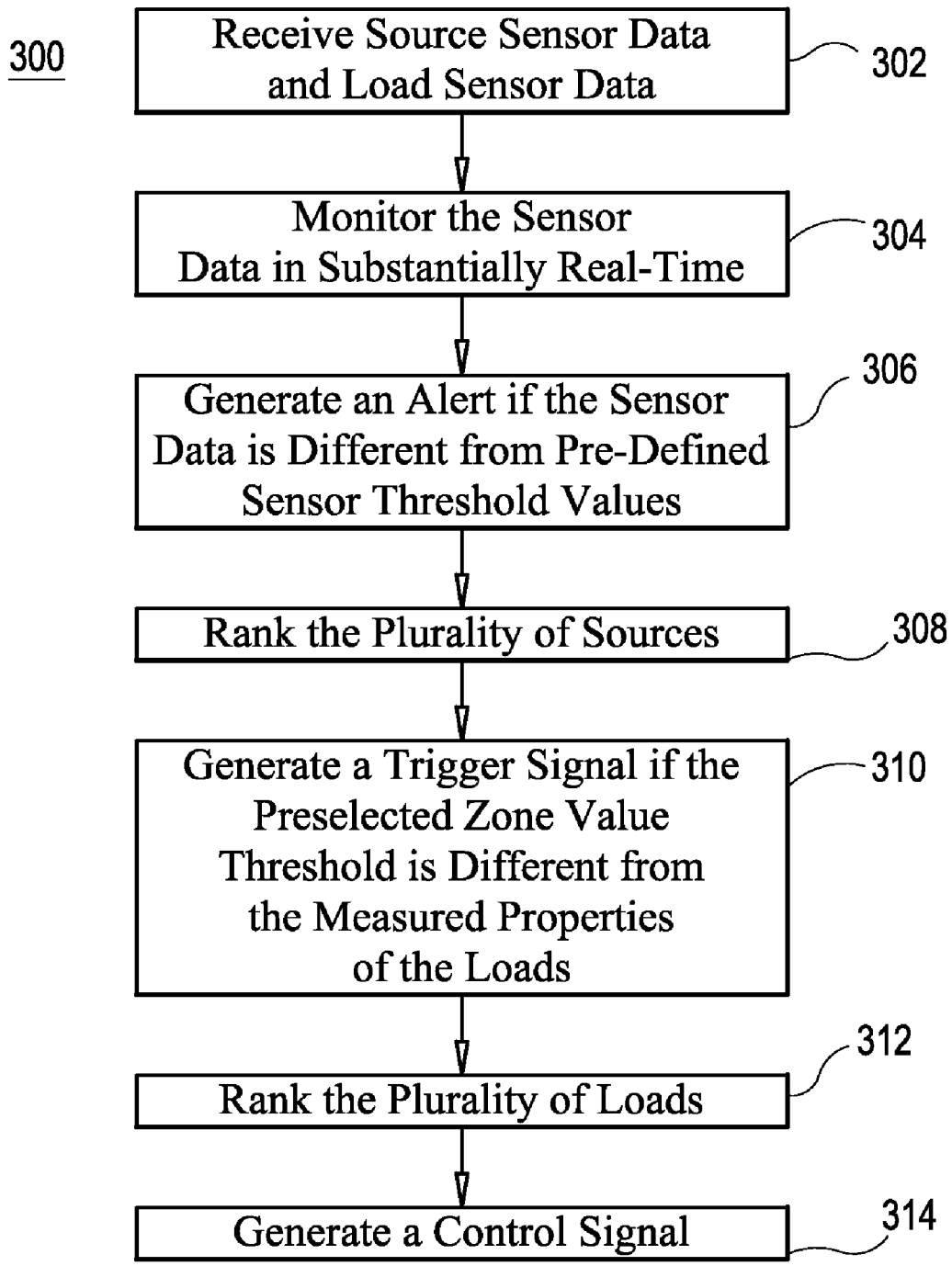
FIG. 3 illustrates a flow chart for controlling coupling and decoupling of a plurality of sources and loads.

FIG. 3 illustrates a method of controlling a plurality of sources, including on-demand sources 105, semi-on-demand sources 108, and intermittent sources 110, and a plurality of load zones 115. The controller devices 130 communicate with the plurality of sources, a plurality of source sensors, the plurality of load zones and a plurality of load zone sensors. In operation 302, the controller receives source sensor data and load sensor data. In operation 304, sensor data is monitored in substantially real-time. In operation 306, an alert is generated if the sensor data is different than the predefined sensor threshold values. In operation 308, the plurality of sources are ranked based on stored criteria and information regarding the on-demand sources 105, the semi-on-demand sources 108, the intermittent sources 110, and the data obtained from the sensors 107, 109, 112, among other devices. In operation 310, a trigger signal is generated if the preselected values received from at least one of the plurality of loads are different from the measured properties received from the corresponding load zone. In operation 312, the plurality of loads is ranked based on stored criteria and information regarding the loads 115 and the data obtained from the load sensors 117, among other devices. In operation 314, a control signal is generated to fluidly or thermally couple selected ones of the plurality of sources to selected ones of the plurality of load, or to fluidly or thermally decouple the plurality of sources and loads.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents.

What is claimed is:

1. A hydronic system, comprising:
    a plurality of sources, selected from the group consisting of an on-demand source, a semi-on-demand source, and an intermittent source;
    a plurality of source sensors that are positioned to measure properties of the plurality of sources;
    a plurality of loads that are fluidly or thermally coupled to the plurality of sources;
    a plurality of load sensors that are positioned to measure properties of the plurality of loads; and
    a controller that communicates with the plurality of sources, the plurality of source sensors, the plurality of loads and the plurality of load sensors, the controller comprising:
        a sensor interface that communicates with the plurality of source sensors and the plurality of load sensors to receive source sensor data and load sensor data;
        a monitoring module that monitors the sensor data in substantially real-time;
        an alert module that generates an alert signal if the sensor data is different from predefined sensor threshold values;
        a ranking module that ranks the sources and the loads;
        a temperature setpoint module that contains preselected values for at least one of the plurality of loads;
        a trigger module that generates a trigger signal if the preselected values from the temperature setpoint module are different from the measured properties received from the corresponding load; and
        an actuator module that communicates with the alert module, the ranking module and the trigger module and generates a control signal to fluidly or thermally couple selected ones of the plurality of sources to selected ones of the plurality of loads, or to fluidly or thermally decouple the plurality of sources and loads.

2. The hydronic system of claim 1, wherein the actuator module fluidly or thermally couples selected ones of the plurality of sources to a heat storage device or at least one of the plurality of loads when the alert module generates the alert signal.

3. The hydronic system of claim 1, wherein the actuator module fluidly or thermally couples selected ones of the plurality of sources to a heat storage device or at least one of the plurality of loads when the alert module generates the alert signal and the trigger module generates the trigger signal.

4. The hydronic system of claim 1, wherein the actuator module fluidly or thermally decouples the plurality of sources from the plurality of loads when the alert module fails to generate the alert signal.

5. The controller of claim 1, wherein the actuator module fluidly or thermally couples selected ones of the plurality of sources to at least one of the plurality of loads when the trigger module generates the trigger signal.

6. The hydronic system of claim 1, wherein the ranking module ranks the sources to provide priority based on carbon neutrality or cost of energy.

7. The hydronic system of claim 1, wherein the ranking module ranks the sources to provide priority to sources that match temperature or heat flux delivery criteria requested by the corresponding load.

8. The hydronic system of claim 1, wherein the ranking module ranks the loads to provide priority based on a preset ranking order established by a user.

9. The hydronic system of claim 1, wherein the ranking module ranks the sources to provide priority to the intermittent source over the on-demand source.

10. A controller for a hydronic system that communicates with a plurality of sources, selected from the group consisting of an on-demand source, a semi-on-demand source, and an intermittent source, a plurality of source sensors that are positioned to measure properties of the plurality of sources, a plurality of loads that are fluidly or thermally coupled to the plurality of sources, a plurality of load sensors that are positioned to measure properties of the plurality of loads, the controller comprising:
 a sensor interface that communicates with the plurality of source sensors and the plurality of load sensors to receive source sensor data and load sensor data;
 a monitoring module that monitors the sensor data in substantially real-time;
 an alert module that generates an alert signal if the sensor data is different from predefined sensor threshold values;
 a ranking module that ranks the sources and the loads;
 a temperature setpoint module that contains preselected values regarding at least one of the plurality of loads;
 a trigger module that generates a trigger signal if the preselected values from the temperature setpoint module is different from the measured properties received from the corresponding load; and
 an actuator module that communicates with the alert module, the ranking module and the trigger module and generates a control signal to fluidly or thermally couple selected ones of the plurality of sources to selected ones of the plurality of loads or to fluidly or thermally decouple the plurality of sources and loads.

11. The controller of claim 10, wherein the actuator module fluidly or thermally couples selected ones of the plurality of sources to a heat storage device or at least one of the plurality of loads when the alert module generates the alert signal.

12. The controller of claim 10, wherein the actuator module fluidly or thermally couples selected ones of the plurality of sources to a heat storage device or at least one of the plurality of loads when the alert module generates the alert signal and the trigger module generates the trigger signal.

13. The controller of claim 10, wherein the actuator module fluidly or thermally couples selected ones of the plurality of sources to a heat storage device or at least one of the plurality of loads when the trigger module generates the trigger signal.

14. The controller of claim 10, wherein the actuator module fluidly or thermally decouples the plurality of sources from the plurality of loads when the alert module fails to generate the alert signal.

15. The controller of claim 10, wherein the ranking module ranks the sources to provide priority based on carbon neutrality or cost of energy.

16. The controller of claim 10, wherein the ranking module ranks the sources to provide priority to sources that match temperature or heat flux delivery criteria requested by the corresponding load.

17. The controller of claim 10, wherein the ranking module ranks the loads to provide priority based on a preset ranking established by a user.

18. The controller of claim 10, wherein the ranking module ranks the sources to provide priority to the intermittent source over the on-demand source.

19. A method of managing a hydronic system, comprising:
 providing a plurality of sources, selected from the group consisting of an on-demand source, a semi-on-demand source, and an intermittent source;
 providing a plurality of sensors that are positioned to measure properties of the plurality of sources;
 providing a plurality of loads that are fluidly or thermally coupled to the plurality of sources;
 providing a plurality of load sensors that are positioned to measure properties of the plurality of loads; and
 providing a controller that communicates with the plurality of sources, the plurality of source sensors, the plurality of loads and the plurality of load sensors, the controller performing the steps of:
  communicating with the plurality of source sensors and the plurality of load sensors to receive source sensor data and load sensor data;
  monitoring the sensor data in substantially real-time;
  generating an alert signal if the sensor data is different from predefined sensor threshold values;
  ranking the sources and the loads;
  receiving preselected values from at least one of the plurality of loads;
  generating a trigger signal if the preselected values received from at least one of the plurality of loads is different from the measured properties received from the corresponding load; and
  generating a control signal to fluidly or thermally couple selected ones of the plurality of sources to selected ones of the plurality of loads, or to fluidly or thermally decouple the plurality of sources and loads based on the alert signal, the trigger signal, the source and load ranking, and a set of rules maintained by the controller.

20. The method of claim 19, further comprising enabling modification of the set of rules based on manual entry of instructions or automatically based on analyzing data from the sensors.

* * * * *